Aug. 24, 1937.                    J. OSAWA                    2,090,806
                              METALLIC RECTIFIER
                             Filed June 6, 1936

INVENTOR
JUICHI OSAWA
BY
ATTORNEY

Patented Aug. 24, 1937

2,090,806

UNITED STATES PATENT OFFICE 2,090,806

METALLIC RECTIFIER

Juichi Osawa, Shikokumachi Mita, Shibaku, Tokyo, Japan, assignor to International Standard Electric Corporation, New York, N. Y., a corporation of Delaware Application June 6, 1936, Serial No. 83,953
In Japan August 29, 1935

3 Claims. (Cl. 175—366)

This invention relates to metallic rectifiers and pertains more particularly to metallic rectifiers or modulators comprising a plurality of piled rectifier segments or plates and to the construction of a rectifier or modulator system having a plurality of arms.

In connection with the construction of rectifiers or modulators of this type it has been the practice heretofore to provide a central hole in each of the segments through which an insulating support may be passed to hold the segments in alignment and press them together. But in the construction of small current capacity devices the outer diameter of the rectifier segments is small and for this reason it is sometimes difficult to provide for the economical construction of the devices utilizing the central holes and centrally located insulating member.

In accordance with the present invention the rectifier segments have no central holes but are held in alignment by three or more parallel supports in an encircling arrangement which supports may at the same time be used as terminals for the apparatus.

The invention will be explained more fully in the following description taken in conjunction with the accompanying drawing.

In the drawing

Figure 1:
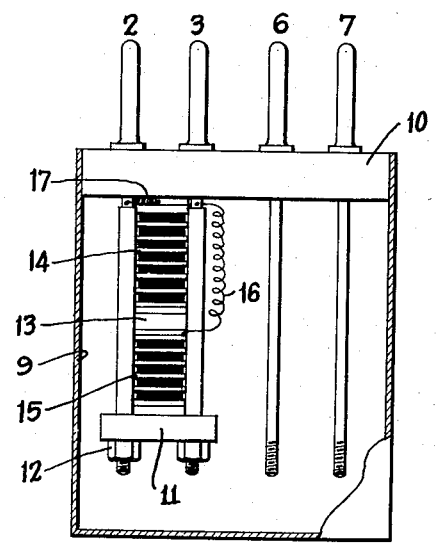
Fig. 1 is a side view of a rectifier or modulator constructed in accordance with my invention, the outer case thereof being partly broken away.
Figure 3:
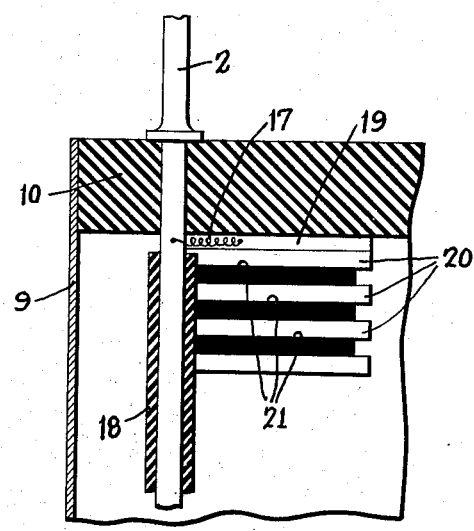
Fig. 3 is an enlarged side elevation view partly in section of part of the device shown in Fig. 1.
Figure 2:
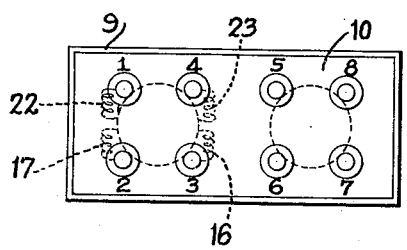
Fig. 2 is a plan view of the device shown in Fig. 1.
Figure 4:
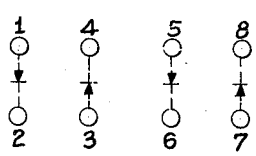
Fig. 4 shows the direction of current flow in each arm of a rectifier system having four arms.

Referring more particularly to the drawing:

Fig. 1 illustrates a design suitable for a four-arm rectifier system. In this figure and Fig. 2 reference numerals 1, 2, 3, 4, 5, 6, 7 and 8 indicate metal support and terminal members which extend through an insulating terminal plate 10 and serve to compress two rectifier arms 14 and 15 which are arranged in the space between the supports and are held in compression by insulating end plate 11 against which the nuts 12 of the supports press. An insulating plate 13 is inserted between the two pile members in order to insulate one from the other. Each one of the supports is preferably supplied with an insulating sleeve 18, as shown in Fig. 3, and connections between the upper ends of piles 14 and 15 are made to terminals 2 and 3, respectively, by means of conductors 17 and 16. Similarly the lower ends of the piles are connected by wires 22 and 23 with the supports 1 and 4, as shown in Fig. 2. Each one of the piles consists of a plurality of rectifier segments 20 and contact members 21. The entire structure is enclosed in a case 9. The flow of current through the completed four-arm device may be as shown by the arrows in Fig. 4, wherein the reference numerals indicate the terminal members or supports.

While in the specific embodiment of the device illustrated in the drawing two independent terminals are provided for each of the four rectifier arms or piles, it is possible to arrange two rectifier arms in series and to provide a common terminal at the junction of the two. In such case the total number of terminals used may be six, and these may be arranged in one group to enclose all four rectifier arms. Furthermore, in the event that it is not necessary to have an intermediate connection between two pairs of serially connected arms, the terminals may be reduced to four and the number of supports may likewise be reduced to four arranged to enclose the entire four arms therebetween. All of the support members need not serve as conducting terminals since in certain cases, for example, where the rectifier has only one pile member, or where two pile members are used in parallel, only two terminals may be necessary.

By means of the above described construction no central holes in the rectifier segments are necessary since these segments are enclosed by a plurality of supports which serve to prevent the escape of the segments. Since no central hole is necessary the ratio of the effective area to the outer diameter of the rectifier segments is made larger than in the perforated type, a marked advantage in the construction of comparatively small size devices. Furthermore, since the pressure holding the pile members together is applied at a plurality of places, e. g. 4, it is possible easily to apply the correct pressure and maintain the rectifier segments in proper contact relation.

While I have described a particular embodiment of my invention for the purpose of illustration it should be understood that various modifications and adaptations thereof according to one skilled in the art may be made within the spirit of the invention as set forth in the appended claims.

What I claim is:

1. A metallic rectifier comprising an insulating terminal plate and an insulating end plate, a plurality of support members interconnecting said plates and arranged in parallel and encircling form, rectifier members positioned between said support members, means for drawing the said insulating plates together to apply pressure to said rectifier members and means connecting said rectifier members to said support members, whereby said support members serve as terminals.

2. A device in accordance with claim 1 wherein a plurality of electrically insulated pile members are held by said support members and the terminals of separate pile members are attached to separate support members the ends of which serve as terminals.

3. A device in accordance with claim 1 wherein two pile members are pressed together and prevented from sidewise movement by three support members arranged in encircling relationship and electric connections are provided between the two ends and the common point of the pile members, and the three support members.

JUICHI OSAWA.